United States Patent
Rosén

(10) Patent No.: US 11,095,210 B2
(45) Date of Patent: Aug. 17, 2021

(54) MITIGATION OF TOUCH CURRENT IN HANDHELD ELECTRICAL TOOLS

(71) Applicant: HUSQVARNA AB, Huskvarna (SE)

(72) Inventor: Magnus Rosén, Alingsås (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 16/344,419

(22) PCT Filed: Oct. 23, 2017

(86) PCT No.: PCT/SE2017/051035
§ 371 (c)(1),
(2) Date: Apr. 24, 2019

(87) PCT Pub. No.: WO2018/080378
PCT Pub. Date: May 3, 2018

(65) Prior Publication Data
US 2020/0052581 A1    Feb. 13, 2020

(30) Foreign Application Priority Data
Oct. 24, 2016   (SE) .................................... 1651385-5

(51) Int. Cl.
*H02M 1/44*       (2007.01)
*H01B 9/02*       (2006.01)
(Continued)

(52) U.S. Cl.
CPC ................. *H02M 1/44* (2013.01); *H01B 9/02* (2013.01); *H02M 1/4225* (2013.01); *H02M 2001/123* (2013.01)

(58) Field of Classification Search
CPC ................................. H02M 1/44; H01B 9/02
(Continued)

(56) References Cited

U.S. PATENT DOCUMENTS 4,849,950 A   7/1989  Sugiura et al.
5,777,866 A   7/1998  Jacobs et al.
(Continued)

FOREIGN PATENT DOCUMENTS

CN    103545786 A    1/2014
DE    198 50 853 A1  5/2000
(Continued)

OTHER PUBLICATIONS

International Search Report and Written Opinion for International Application No. PCT/SE2017/050239 dated Jan. 23, 2018.
(Continued)

*Primary Examiner* — Kawing Chan
(74) *Attorney, Agent, or Firm* — Burr & Forman, LLP

(57) ABSTRACT

An arrangement (100) of an electrical power tool for reducing a touch current is disclosed. The arrangement comprises a filter (101) configured to reduce electrical interference, a voltage booster (102) configured to rectify and increase an alternating current into a direct current, a motor comprising a motor drive (104) configured to power the electrical power tool, and a choke impedance (103) arranged between the voltage booster and the motor drive such that an input of the choke impedance is connected to the voltage booster and an output of the choke impedance is connected to the motor drive.

12 Claims, 2 Drawing Sheets

(51) Int. Cl.
*H02M 1/42* (2007.01)
*H02M 1/12* (2006.01)

(58) Field of Classification Search
USPC .......................................................... 361/23
See application file for complete search history.

(56) References Cited

U.S. PATENT DOCUMENTS

| | | | |
|---|---|---|---|
| 5,969,583 A * | 10/1999 | Hutchison | H03H 7/427 |
| | | | 333/12 |
| 6,037,686 A | 3/2000 | Schönauer et al. | |
| 6,603,317 B2 | 8/2003 | Tokita | |
| 6,809,579 B2 | 9/2004 | Vandewege | |
| 7,538,454 B2 | 5/2009 | Yu et al. | |
| 8,503,150 B2 | 8/2013 | Chang | |
| 8,546,690 B2 * | 10/2013 | Masakazu | H01B 11/002 |
| | | | 174/103 |
| 8,921,747 B2 | 12/2014 | Wang et al. | |
| 9,124,168 B2 | 9/2015 | Sun et al. | |
| 9,166,394 B2 | 10/2015 | Ripoll et al. | |
| 2003/0133236 A1 * | 7/2003 | Legatti | H02H 3/334 |
| | | | 361/42 |
| 2005/0201126 A1 | 9/2005 | Uchida | |
| 2006/0021787 A1 * | 2/2006 | Fetterolf, Sr. | H01B 7/225 |
| | | | 174/113 R |
| 2008/0265808 A1 | 10/2008 | Sparey et al. | |
| 2012/0195078 A1 | 8/2012 | Levin et al. | |
| 2017/0246736 A1 * | 8/2017 | Kikuchi | B25D 11/005 |
| 2019/0244509 A1 | 8/2019 | Nishikawa et al. | |

FOREIGN PATENT DOCUMENTS

| | | |
|---|---|---|
| EP | 0951135 A2 | 10/1999 |
| EP | 2614575 B1 | 3/2015 |
| JP | H11-266530 A | 9/1999 |
| JP | 2000-315929 A | 11/2000 |
| JP | 2006136058 A | 5/2006 |
| KR | 10-0928214 B1 | 11/2009 |
| WO | 2012/162582 A1 | 11/2012 |
| WO | 2015118900 A1 | 8/2015 |

OTHER PUBLICATIONS

International Type Search Report for Swedish Application No. 1651385-5 dated Aug. 14, 2017.

Vaughan, P., "Designing low leakage current power supplies," Power Integrations Inc., p. 1-3 (Nov. 11, 2004).

Lanzisero, T. P., "A Hazard-Based Approach to Reduce the Risk of Shock," IAEI Magazines, pp. 9 (Sep. 16, 2006).

* cited by examiner

MITIGATION OF TOUCH CURRENT IN HANDHELD ELECTRICAL TOOLS

TECHNICAL FIELD

The present invention relates generally to the field of handheld or portable electrical tools. More particularly, it relates to mitigation of touch currents in handheld or portable electrical tools.

BACKGROUND

In the field of electrical tools such as handheld electrical power tools there are certain standards and regulations regarding safety of an operator when electrical malfunctions which may cause dangerous, or even deadly, injury to the operator occur. The standards IEC 60479 Effects of current on human being and livestock, UL 60745 Hand-Held Motor-Operated Electric Tools—Safety, EN 60335 Household and similar electrical appliances—Safety, dictate for example the maximum size of leaking touch currents, i.e. currents that originates from a malfunction in the protective ground wiring and which may escape to the housing of the electrical tool and chock or injury the operator.

The standards also dictate the amount of electrical interference, radiation or noise that the electrical tools may at most induce to its surroundings.

However, a problem may typically occur when both the criteria of low electrical noise and low touch currents are to be fulfilled.

In order reduce noise or interference, electro magnetic filters (EMI-filters) are typically introduced into the circuitry. However, in order to reduce as much electrical noise as possible, the filters typically comprise large capacitances. The capacitances are potentially hazardous as they may lead very large touch currents to the housing which may chock an operator using the electrical tool if a malfunction occurs in the protective ground wiring.

According to the regulations, it should typically be guaranteed that currents over 0.75 milliamperes resulting from capacitive leakage can never escape to the housing and chock a user. Another effect is that if the product is equipped with a sensitive RCD it may nuisance trip due to the high leakage current, i.e. trip even though no actual error has occurred.

The RCD measures incoming currents and compares them to returning currents. If these do not match, it is an indication that some current is leaking away and that a malfunction may possibly have occurred. When this is detected the RCD breaks the circuit so that no current flows in it any longer and the tool is no longer operable.

However there is a risk that low amplitude currents are not detected by the RCD. These currents may also pose a threat since they may cause burns, pain or spasms to the operator which may lead to him or her dropping the electrical tool, or falling from construction scaffoldings or the like.

Furthermore, currents resulting from frequencies of about 50-60 Hz may also negatively affect the nervous system and the heart of a person, possibly leading to cardiac arrest. People with heart disorders or weak health may be at a particular risk of receiving a lethal shock if being subjected by currents in that particular frequency range.

A straight forward way to reduce currents which originates from low frequencies is to reduce the capacitances of the EMI filters. However, this makes it difficult to meet the regulations regarding emission of noise and electrical interference from the electrical tool.

Therefore, there is a need for an electrical power tool with reduced risk of leaking touch currents in a broad frequency range such that touch currents resulting from frequencies over 50 Hz are mitigated, while maintaining an acceptable level of electrical noise within the circuitry of the electrical power tool.

SUMMARY

It is an object of the teachings herein to provide arrangements of an electrical power tool as well as an electrical power tool for reducing leaking touch currents and which mitigates at least some of the problems elaborated on above for conventional RCDs.

According to a first aspect, this is achieved by an arrangement of an electrical power tool for reducing a touch current. The arrangement comprises a filter configured to reduce electrical interference, a voltage booster configured to rectify and increase an alternating current into a direct current, a motor comprising a motor drive configured to power the electrical power tool, and a choke impedance arranged between the voltage booster and the motor drive such that an input of the choke impedance is connected to the voltage booster and an output of the choke impedance is connected to the motor drive.

In some embodiments, the choke impedance is one of a common mode choke or a differential mode choke or a combination of the two.

In some embodiments, the voltage booster and the motor drive are arranged in separate logical units isolated from each other with at least one uni- or bi-directional optically isolated digital translator.

In some embodiments, the motor is an asynchronous induction motor, synchronous permanent motor or switched reluctance motor.

In some embodiments, the voltage booster may be configured to boost or increase the alternating current being in a voltage range of 200-480 V to the direct current being in a voltage range of 600-800 V.

In some embodiments, the filter is an electromagnetic, EMI, filter comprising at least one capacitance.

In some embodiments, the common mode choke may be configured to react to an increase of a current frequency and reduce the touch current resulting from current frequencies of 50 Hz or higher by increasing its impedance as a response to the increase of the current frequency.

A second aspect is an arrangement of an electrical power tool for reducing a touch current. The arrangement comprises a filter configured to reduce electrical interference, a voltage booster configured to increase and rectify an alternating current into a direct current, a motor comprising a motor drive configured to power the electrical device and a motor cable comprising at least one conductor wire, a protective shield and a protective ground wire. The motor cable is configured to provide power to the motor, and the protective shield of the motor cable is configured to shield the protective ground wire from the at least one conductor wire by separating the at least one conductor wire from the protective ground wire such that the at least one conductor wire is arranged within the protective shield and the protective ground wire is arranged outside the protective shield.

In some embodiments, the protective shield of the motor cable is connected to a neutral point within a high frequency domain of the arrangement, and the high frequency domain comprises the motor drive.

In some embodiments, the protective shield of the motor cable is connected to at least one of a neutral center direct current bus, positive direct current bus or a negative direct current bus in the high frequency domain by at least one impedance.

In some embodiments, the at least one impedance is a Y-capacitance.

In some embodiments, the motor is an asynchronous induction motor, synchronous permanent motor or a switched reluctance motor.

A third aspect is an electrical power tool comprising the arrangement according to any of the first and second aspects either separately or in combination.

In some embodiments, the electrical power tool is a portable and/or handheld electrical power tool.

In some embodiments, the electrical power tool is configured to operate with one phase powering, two phase or three phase powering.

In some embodiments, the second and third aspects may additionally share or have identical features as those described for the first aspect.

An advantage of some of the embodiments is that reduction of leaking touch currents in an electrical power tool is enabled.

Another advantage of some of the embodiments is that reduction of stray capacitances within the circuitry of an electrical power tool is enabled.

Still another advantage of some of the embodiments is that an electrical power tool which is safe to handle and operate is provided.

Yet another advantage of some of the embodiments is that no tradeoff needs to be made between reducing touch currents and reducing stray capacitances within an electrical power tool.

BRIEF DESCRIPTION OF THE DRAWINGS

Embodiments of the teachings herein will be described in further detail in the following with reference to the accompanying drawings which illustrate non-limiting examples on how the embodiments can be reduced into practice and in which.

DETAILED DESCRIPTION OF EMBODIMENTS

The disclosed embodiments will now be described more fully hereinafter with reference to the accompanying drawings, in which certain embodiments of the invention are shown.

Figure 1:
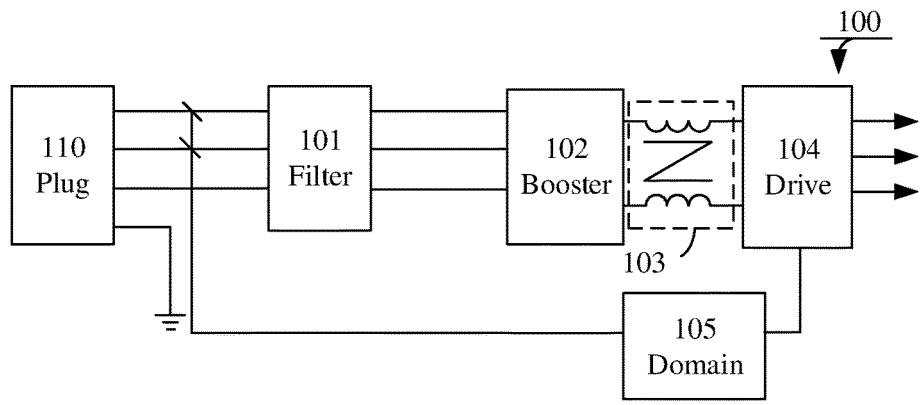
FIG. 1 shows an example block diagram of an electrical power tool according to some embodiments.

FIG. 1 shows an example block diagram of an arrangement 100 of an electrical power tool according to some embodiments.

The arrangement 100 comprises a filter 101 configured to reduce electrical interference, a voltage booster 102 configured to rectify and convert an alternating current into a direct current, a motor (not shown) comprising a motor drive 104 configured to power the electrical power tool.

The arrangement 100 for reducing the touch current may further comprise a choke impedance 103 arranged between the voltage booster 102 and the motor drive 104 such that an input of the choke impedance 103 is connected to the voltage booster 102 and an output of the choke impedance 103 is connected to the motor drive 104.

In some embodiments, the arrangement 100 may further comprise a plug 110 configured to provide the electrical power tool with power.

The voltage booster 102 may be configured to boost or amplify as well as convert the alternating current which is in a voltage range of 230-400 V into a direct current in a voltage range of 460-800 V.

The motor of the electrical power tool may be of high frequency type, such as a commutator or an asynchronous induction motor, a synchronous permanent motor or a switched reluctance motor, using alternating current induction or permanent magnet synchronization. This type of motor has an advantage in that the motor is powerful and easy to control in terms of motor speed and torque by means of the motor drive 104 which may e.g. be a high frequency modulated drive unit.

However, the high frequency may also give rise to large electro magnetic current disturbance.

E.g. the filter 101 may be an electro magnetic interference (EMI) filter. In order to filter EMI from the motor drive 104, the filter 101 may comprise a cascade of multiple alternating current phase input EMI filter inductors. The EMI filter 101 is in some embodiments necessary in order to reduce EMI emission from the motor to acceptable levels, and the filter may typically comprise inductors of large dimensions.

However, the inductors also give rise to an impedance and capacitance that is mainly proportional to the main voltage which powers the electrical power tool, i.e. a high frequency touch current.

The inventors have realized after insightful and inventive reasoning, that the high frequency touch currents resulting from the EMI filter may be optimally reduced if a large impedance, e.g. the choke impedance 103 of FIG. 1, is arranged between the voltage booster and the motor drive of the electric power tool.

The large impedance may e.g. be one or more common mode chokes, differential chokes or a combination of the two types.

The choke impedance 103 is configured to reduce high frequencies since an increase in current frequency gives rise to an increase in the choke's impedance. For instance, the choke impedance 103 may be configured to react to an increase of a current frequency and reduce the touch current resulting from current frequencies of 50 Hz or higher by increasing its impedance as a response to the increase of the current frequency.

However, it is important that sufficient isolation is kept between the low frequency domain and high frequency domain of the electrical power tool.

Figure 2:
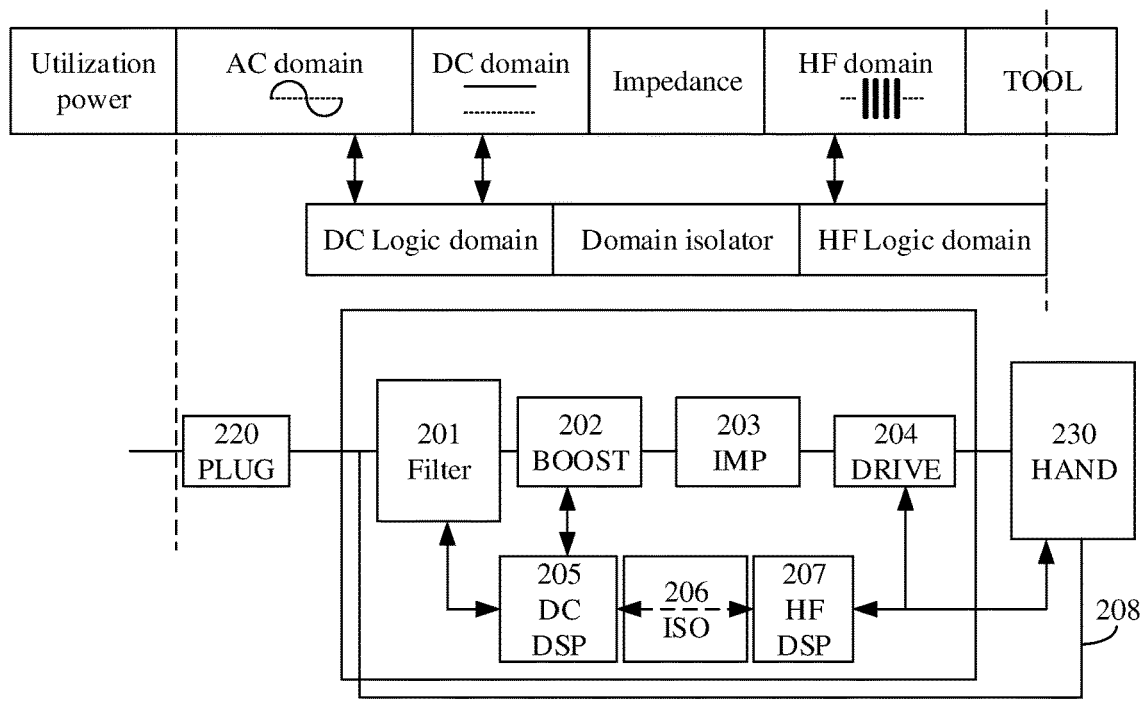
FIG. 2 shows an example block diagram of an electrical power tool according to some embodiments, FIGS. 3A and 3B each show an example block diagram of an electrical power tool according to some embodiments.

FIG. 2 shows schematically how the various components of the arrangement described in e.g. FIG. 1 correlates to the various domains of the electrical power tool.

An electrical power tool will be supplied with some sort of utilization power, e.g. one, two or three phase current. The current will be an alternating current. The parts of the electric power tool which are supplied with the alternating current may be defined as being part of the alternating current domain (AC domain).

The AC current is then transformed into a direct current, and the parts which receive the direct current may be defined as being part of the direct current domain (DC domain).

The AC and DC domain may give rise to low frequency currents.

The direct current and voltage is then amplified so that its frequency is increased. Thus the current enters the high frequency domain (HF domain).

The AC domain and DC domain further corresponds to a DC logic domain, whereas the HF domain corresponds to a HF logic domain.

The DC logic domain and HF logic domain are in conventional electrical power tools heavily isolated by means of domain isolators. However, according to some embodiments of the invention, an impedance is arranged between the DC domain and the HF domain. This may result in a degradation of the isolation between the DC logic domain and the HF logic domain.

FIG. 2 further illustrates how the components according to some embodiments correspond to the domains described above.

The electrical power tool may comprises a plug (PLUG) 220 for supplying the tool with power, such as three phase voltage, one or two phase voltage and current. This may be located in the AC domain.

The current passes a filter (Filter) 201 (e.g. the filter 101 of FIG. 1) and is then received by a voltage booster (BOOST) 202 (e.g. the voltage booster 102 of FIG. 1).

A choke impedance (IMP) 203 is arranged between the voltage booster 202 and a motor drive unit (DRIVE) 204. The choke impedance 203 and the motor drive unit 204 may e.g. be the choke impedance 103 and motor drive unit 104 of FIG. 1.

The filter 201 and booster 202 may be part of the DC logic domain.

The filter 201 and voltage booster 202 communicates with a digital signal processor for direct currents (DC DSP) 205.

The voltage drive unit 204 is connected to a handheld part of the electrical power tool (HAND) 230, e.g. the housing of the electrical power tool. The voltage drive unit 204 and handheld part 230 may be part of the HF domain.

The voltage drive unit 204 and handheld part 230 communicates with a digital signal processor for high frequency currents (HF DSP) 207.

The digital signal processor for direct currents 205 and digital current processor for high frequency currents 207 are isolated from each other by means of isolation block 206.

Thus FIG. 2 illustrates that an impedance, e.g. a common mode choke or a differential mode choke is arranged between the direct current domain and the high frequency domain of the electrical power tool, and that isolation is achieved between the domains, as will be described closer in conjunction with FIG. 3B.

Figure 3A:
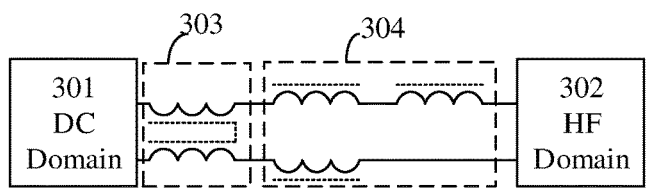

FIG. 3A illustrates an example implementation where the choke impedance (e.g. the choke impedance 103 of FIG. 1) is implemented by a common mode choke 303 and differential mode chokes 304 arranged between a direct current domain 301 and a high frequency domain 302 of a electrical power tool (e.g. the domain and the electrical power tool described in conjunction with any of the FIGS. 1 and/or 2).

The direct current domain typically ends with the up-conversion of the drive voltage of the electrical power tool which is performed by e.g. a voltage booster (e.g. the voltage booster 102, 202 of FIGS. 1-2). The high frequency domain typically starts with the boosted voltage entering the motor drive (e.g. the motor drive 104, 204 of FIGS. 1-2).

However, a boosted voltage may also give rise to high frequency leaking currents, which may be decreased by means of the inventive arrangement of the chokes. The chokes may e.g. make sure that leaking currents are kept on the motor drive and does not propagate elsewhere in the tool.

However, arranging the chokes between the voltage booster and motor drive is not something that has been tried in prior art since it would introduce a severe isolation between the direct current domain and the high frequency domain of the electric power tool. It is important that good isolation is maintained between the domains in order to not provide a path for unwanted interference current to escape between the domains and damage the various components of the domains and their functions.

The inventive arrangement of the choke impedance ensures that leaking touch currents stay in the motor drive and do not wander or leak away so that they may be conducted in particular by the protective ground cable which is designed to protect a user but may instead lead to damage, or that high frequency currents leaks to the housing of the electrical power tool.

Figure 3B:
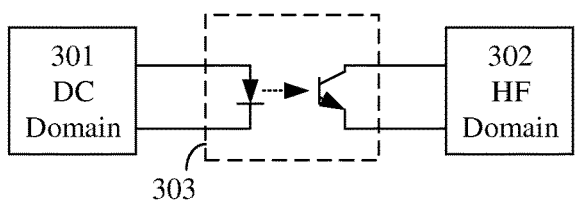

FIG. 3B shows schematically how sufficient isolation may be achieved.

In order to enhance the isolation between the alternating current domain and the direct current domain, the voltage booster and the motor drive of an electrical power tool (e.g. the voltage booster and motor drive described in conjunction with any of the FIGS. 1-2) may be arranged in separate logical units isolated from each other e.g. by means of digital isolators. Thus isolated transmission of digital signals may be enabled.

E.g. the voltage booster may be arranged in the direct current domain 301, and the motor drive may be arranged in the high frequency domain 302.

The domains may be separated by means of an electronic signal isolator 303 (compare with FIG. 2). The electronic signal isolator 303 may e.g. be optical, magnetic or capacitive devices of one direction or bi-directional type. For instance, integrated microcircuit optical coupled digital isolators may be used.

Thus, the implementation of the electrical power tool according to some embodiments may require more complexity with regards to sufficient isolation between the domains, however this is compensated for by the substantial reduction of leaking touch currents.

The inventive arrangement may e.g. reduce a 50/60 Hz leaking touch current from 3.5 mA to approximately 0.5 mA.

Furthermore, the leaking touch currents may also be reduced by rearranging the impedances present in the motor drive cable of the electric power tool. This may be done in addition, or as an alternative, to the above described arrangements of FIGS. 1-3.

E.g. an arrangement of an electrical power tool may comprise a filter configured to reduce electrical interference, a voltage booster configured to increase and rectify an alternating current into a direct current, a motor comprising a motor drive configured to power the electrical device and a motor cable. The motor cable may comprise at least one conductor wire, a protective shield and a protective ground wire configured to provide power to the motor.

The protective shield of the motor cable may be configured to shield the protective ground wire from the at least one conductor wire by separating the at least one conductor wire from the protective ground wire such that the at least one conductor wire is arranged within the protective shield and the protective ground wire is arranged outside the protective shield.

Figure 4:
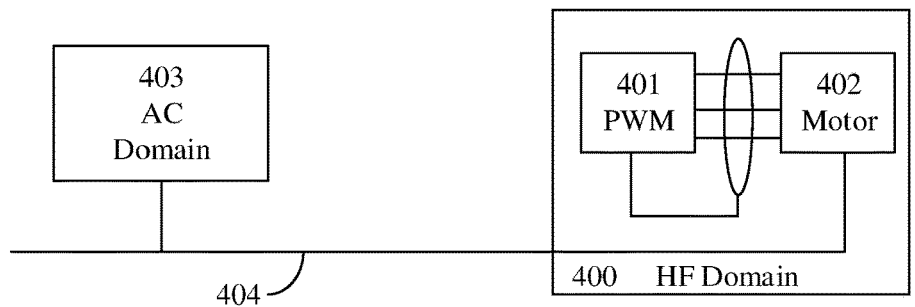
FIG. 4 shows a schematic view of electrical power tool circuit according to some embodiments.

FIG. 4 illustrates schematically the relation between an alternating current domain (AC Domain) 403 of the liquid system tool and a high frequency domain (HF Domain) 400, e.g. the AC and HF domain described in conjunction with FIG. 2.

The HF domain 400 comprises a drive pulse width modulator 401 (PWM) and a motor housing 402 (Motor).

The PWM 401 may be configured to control the frequency of the motor 402, e.g. the may control the speed of the motor rotation and its torque.

A protective ground wire 404 connects the motor housing 402 of the HF domain to a protective ground terminal (not shown) of the AC domain 403.

Figure 5A:
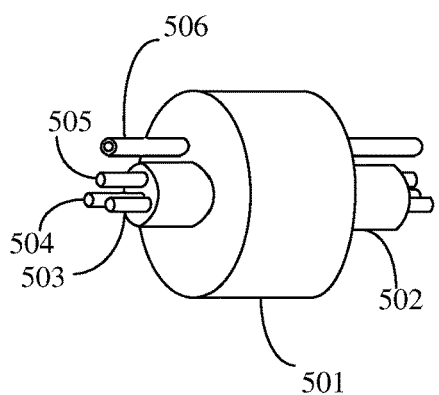
FIG. 5A shows a motor cable arrangement according to some embodiments.
Figure 5B:
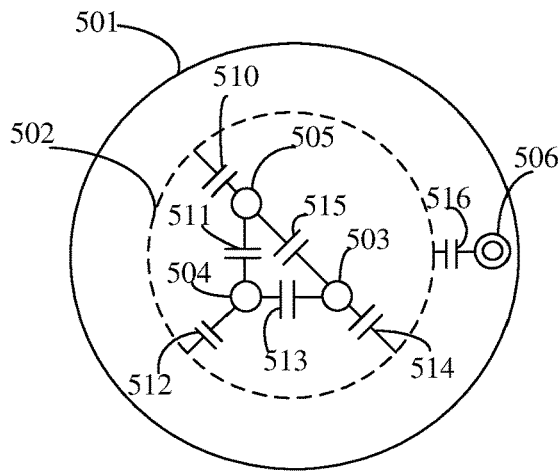
FIG. 5B shows a cross sectional view of a motor cable arrangement according to some embodiments.

FIGS. 5A and 5B each show a schematic drawing of how the impedances of the motor cable may be rearranged.

FIG. 5A shows a motor cable comprising an outer casing 501, a protective shield 502, three conductor wires 503, 504, 505 and a protective ground wire 506.

The three conductor wires 503, 504, 505, which leads the phases of the voltage driving the motor are arranged within the protective shield 502, whereas the protective ground wire 506 is arranged outside the protective shield.

FIG. 5B shows a cross section of the motor cable shown in FIG. 5A. The three conductor wires 503, 504, 505 are arranged within the protective shield 502. When current is lead through the conductor cables, capacitances 510, 511, 512, 513, 514, 515 are formed between the conductor wires 503, 504, 505 and the protective shield 502. However, the capacitances 510, 511, 512, 513, 514, 515 do not affect the protective ground wire 506 which is arranged on the other side of the protective shield 502.

Thus, the protective ground wire 506 is protected from the capacitances formed by the conductive wires by the protective shield 502. This leads to that the risk of influence on the protective ground wire 506 due to leaking currents resulting from the capacitances of the conductive wires is decreased, which leads to that the risk of leaking touch currents is reduced.

In some embodiments, the protective shield of the motor cable may be connected to a neutral point within a high frequency domain of the electric power tool (e.g. the high frequency domain described in conjunction with any of FIGS. 2-4). The high frequency domain may comprise the motor drive. Connecting the shield to a neutral point within the high frequency domain results in high isolation between frequency pulse width modulated motor conductors and the protective ground which is part of the alternating current domain (e.g. the alternating current domain described in conjunction with any of FIGS. 2 and 4).

This connection also reduces the touch currents that may arise from the capacitance 516 which may form between the protective ground wire 506 and the protective shield 502 because the neutral point may in some embodiments like three level motor inverter have same potential as protective earth, thus no leakage current may be induced from the capacitance 516.

The protective shield 502 may thus still function as a high frequency ground, but within the high frequency domain, and the alternating current domain provides a protective ground connection.

For instance, the protective shield of the motor cable may be connected to at least one of a neutral center, a positive direct current bus or a negative direct current bus in the high frequency domain by means of at least one impedance formed by a capacitance. The at least one impedance may e.g. be a Y-capacitance.

Figure 6:
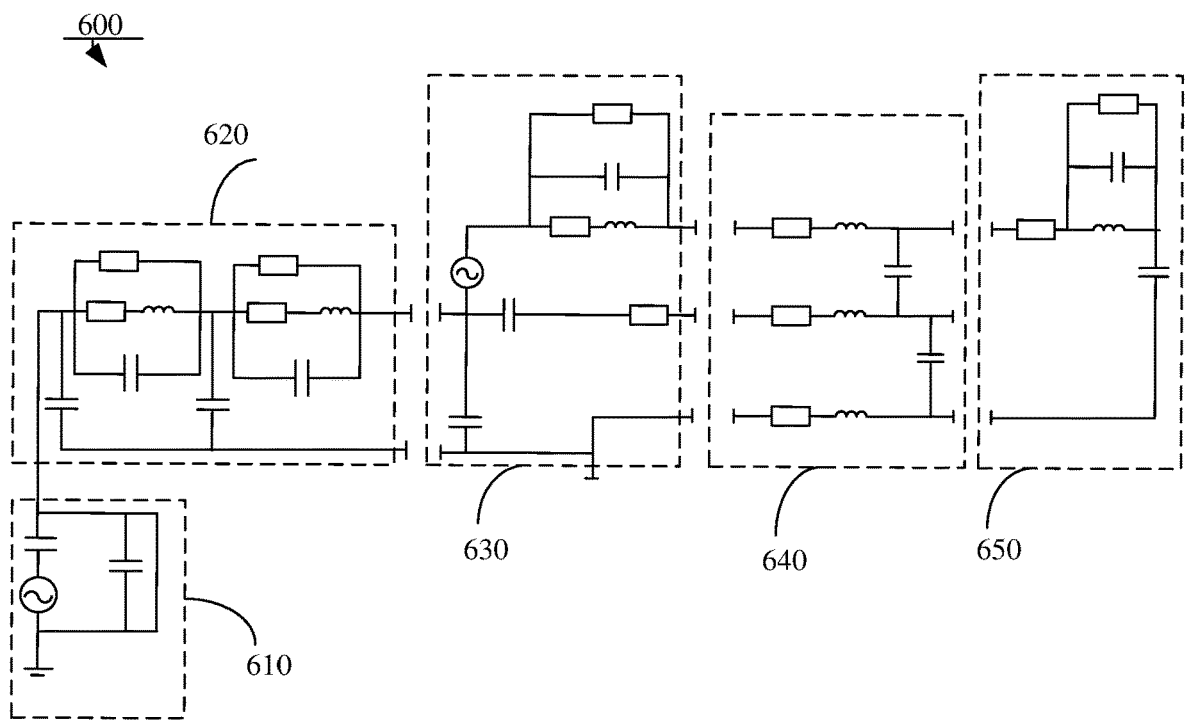
FIG. 6 shows an example block diagram of an electrical power tool according to some embodiments.

FIG. 6 shows a schematic frequency domain analysis circuit of an arrangement 600 of an electrical power tool having a motor cable with rearranged impedances. The motor cable may e.g. be the motor cable described in conjunction with any of FIGS. 5A-5B.

The arrangement comprises a power source 610, a filter 620, a motor drive unit 630, a motor cable 640, and a motor 650

The motor cable 640 is connected between the motor drive unit 630 and the motor 650.

The isolation performance and touch current reduction of the rearrangement of the motor cable is calculated according to the following:

$$C = K\varepsilon_0 \frac{A}{d} \quad L_{CX} = \frac{\mu_0 \mu_r}{2\pi} \ln\left(\frac{D}{d}\right) l$$

wherein D=5*10⁻³, d=1*10⁻³, l=5¬6, A=l*2πr¾, $K_{PVC}$=3 and wherein D denotes the outer diameter of the cable, d is the inner diameter of the cable, l is the length of the cable, A is the surface area of the cable, and $K_{pvc}$ is the relative electricity of the PVC material used in the cable.

As elaborated on above, touch currents may be reduced either by connecting a choke impedance between the voltage booster and the motor drive, or by rearranging the impedances of the motor cable, such as described in conjunction with FIGS. 1-3 and 4-6 respectively.

However, the touch currents may be reduced even further if a combination of the two solutions is utilized.

In some embodiments, such a combination may e.g. be an arrangement of an electrical tool for reducing a touch current. The arrangement comprises a filter configured to reduce electrical interference, a voltage booster configured to rectify and increase an alternating current into a direct current, a motor comprising a motor drive configured to power the electrical device and a motor cable comprising at least one conductor wire, a protective shield and a protective ground wire configured to provide power to the motor, wherein the arrangement further comprises a choke impedance arranged between the voltage booster and the motor drive such that an input of the common mode choke is connected to the voltage booster and a output of the common mode choke is connected to the motor drive.

The interference protection shield of the motor cable is configured to shield the protective ground wire from the at least one conductor wire by separating the at least one conductor wire from the protective ground wire such that the at least one conductor wire is arranged within the protective shield and the protective ground wire is arranged outside the interference protection shield.

Furthermore, the choke impedance may form an interference isolated DC bus, a positive DC bus and a negative DC bus at its outputs and the interference protection shield of the motor cable may be connected to at least one of the neutral center DC bus, positive DC bus or the negative DC bus of the choke impedance. Thus, the choke impedance may provide the isolation of the high frequency domain to which the protective shield should be connected (compare with FIGS. 5A-5B).

E.g. the interference protection shield of the motor cable may be connected to at least one of the neutral center DC bus or the positive DC bus or the negative DC bus by at least one impedance. The at least one impedance may be a Y-capacitance.

In some embodiments, the electrical power tool is a portable and/or handheld electrical power tool, such as a chain saw, power drill, jackhammer, grinder or the like.

In some embodiments, the electrical power tool is configured to operate with one phase powering, two phase powering or three phase powering.

In some embodiments, the motor of the electrical power tool is an asynchronous induction motor. In some embodiments, the motor is a high frequency synchronous permanent magnet motor.

Embodiments herein enable an electric power tool with low risk of chocking a user due to deviating touch currents having a low frequency while still keeping electro magnetic noise below acceptable levels.

An electrical power tool comprising the arrangements according to some embodiments is safe and reliable for a user to operate.

Furthermore, no tradeoff has to be made between keeping down electromagnetic interference and avoiding low frequency touch currents.

The invention claimed is:

1. An arrangement of an electrical power tool for reducing a touch current, wherein the arrangement comprises:
    a filter configured to reduce electrical interference;
    a voltage booster configured to increase and rectify an alternating current into a direct current;
    a motor comprising a motor drive configured to power the electrical power tool; and
    a motor cable comprising:
        plurality of conductor wires, each conductor wire within the plurality of conductor wires being electrically isolated from the other conductor wires in the plurality of conductor wires, and each conductor wire being configured to deliver electrical power to the motor,
        a protective shield that is conductive and axially disposed within the motor cable about a center axis of the motor cable, and
        a protective ground wire;
    wherein the motor cable is configured to provide power to the motor;
    wherein the protective shield of the motor cable is configured to shield the protective ground wire from the plurality of conductor wires by separating the plurality of conductor wires from the protective ground wire such that the plurality of conductor wires are arranged within the protective shield and the protective ground wire is arranged outside the protective shield; and
    wherein the plurality of conductor wires are bundled within the protective shield such that capacitive coupling occurs between the conductor wires and the protective shield and does not affect the protective ground wire.

2. The arrangement according to claim 1, wherein the protective shield of the motor cable is connected to a neutral point within a high frequency domain of the arrangement, and wherein the high frequency domain comprises the motor drive.

3. The arrangement according to claim 1, wherein the protective shield of the motor cable is connected to at least one of a neutral center direct current bus, positive direct current bus or a negative direct current bus in the high frequency domain by at least one impedance.

4. The arrangement according to claim 3, wherein the at least one impedance is a Y-capacitance.

5. The arrangement according to claim 1, wherein the motor is an asynchronous induction motor, a synchronous permanent motor, or a switched reluctance motor.

6. The arrangement according to claim 1 wherein the electrical power tool is a portable and/or handheld electrical power tool.

7. The arrangement according to claim 1 wherein the electrical power tool is configured to operate with three phase powering.

8. The arrangement according to claim 1, wherein the protective ground wire is disposed at a position closer to a outer casing of the motor cable than each of the plurality of protective ground wires that are centrally located within the protective shield.

9. The arrangement of claim 8, wherein capacitive coupling occurs between the protective ground wire and the protective shield.

10. The arrangement of claim 9 further comprising a motor housing and a drive pulse width modulator;
    wherein the motor is housed within the motor housing;
    wherein the drive pulse width modulator is configured to control a speed of motor rotation and an operating torque of the motor;
    wherein a power source is defined in an alternating current (AC) domain and the drive pulse width modulator and the motor are defined in a high frequency (HF) domain;
    wherein the protective ground wire connects the motor housing in the HF domain to a protective ground terminal in the AC domain.

11. The arrangement of claim 8, wherein the plurality of conductor wires are disposed closer to each other than to the protective ground wire.

12. The arrangement of claim 1, wherein the plurality of conductor wires comprise three conductor wires, each of the three conductor wires having a different voltage phasing.

* * * * *